(12) United States Patent
Rydsmo et al.

(10) Patent No.: US 11,697,363 B2
(45) Date of Patent: Jul. 11, 2023

(54) ADJUSTABLE-HEIGHT SEAT DEVICE

(71) Applicant: Autoliv Development AB, Vargarda (SE)

(72) Inventors: Erik Rydsmo, Ljung (SE); Anders Ahlqvist, Vargarda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 80 days.

(21) Appl. No.: 17/310,025

(22) PCT Filed: Jan. 13, 2020

(86) PCT No.: PCT/EP2020/050665
§ 371 (c)(1),
(2) Date: Jul. 12, 2021

(87) PCT Pub. No.: WO2020/148220
PCT Pub. Date: Jul. 23, 2020

(65) Prior Publication Data
US 2022/0118892 A1    Apr. 21, 2022

(30) Foreign Application Priority Data
Jan. 14, 2019   (FR) ..................................... 1900320

(51) Int. Cl.
*B60N 2/30* (2006.01)
*B60N 2/42* (2006.01)

(52) U.S. Cl.
CPC .......... *B60N 2/3086* (2013.01); *B60N 2/309* (2013.01); *B60N 2/3065* (2013.01); *B60N 2/43* (2013.01)

(58) Field of Classification Search
None
See application file for complete search history.

(56) References Cited

U.S. PATENT DOCUMENTS

| 5,104,182 A | * | 4/1992 | Rasnick | ................. | A47C 7/543 |
| | | | | | 297/188.14 |
| 5,152,578 A | * | 10/1992 | Kiguchi | ................. | B60N 2/045 |
| | | | | | 188/371 |
| 5,657,950 A | * | 8/1997 | Han | ..................... | B64D 11/064 |
| | | | | | 297/216.2 |

(Continued)

FOREIGN PATENT DOCUMENTS

| CN | 2687817 Y | * | 3/2005 |
| DE | 19522967 A1 | | 1/1996 |

(Continued)

*Primary Examiner* — David E Allred
(74) *Attorney, Agent, or Firm* — Dickinson Wight PLLC

(57) ABSTRACT

Adjustable seat device for a vehicle, comprising: -a base portion (10), -a seat portion (20) that is movable with respect to the base portion (10) between a first position, referred to as retracted, and a second position, referred to as extended, -an articulation system (30) forming a deformable parallelogram, which is connected to the base portion (10) and to the seat portion (20) and comprises at least one diagonal support arm (31) connected diagonally to the deformable parallelogram, characterized in that the diagonal support arm (31) is designed to have a first length when the seat portion (20) is in the first position and a second length when the seat portion (20) is in the second position.

12 Claims, 4 Drawing Sheets

(56) References Cited

U.S. PATENT DOCUMENTS

| | | | | |
|---|---|---|---|---|
| 6,106,066 | A * | 8/2000 | Moffa | B60N 2/3043 |
| | | | | 297/332 |
| 6,557,936 | B1 * | 5/2003 | Augsberger | B60N 2/26 |
| | | | | 296/68.1 |
| 10,549,670 | B1 * | 2/2020 | Smith | B60N 2/3031 |
| 2003/0001419 | A1 * | 1/2003 | Roth | B60N 2/01583 |
| | | | | 297/378.1 |
| 2005/0275267 | A1 * | 12/2005 | Schumann | B60N 2/4214 |
| | | | | 297/344.12 |
| 2006/0214459 | A1 * | 9/2006 | Kammerer | B60N 2/309 |
| | | | | 296/65.09 |
| 2011/0175422 | A1 * | 7/2011 | Bruck | B60N 2/829 |
| | | | | 297/410 |
| 2014/0239684 | A1 * | 8/2014 | Mindel | B60N 2/4214 |
| | | | | 248/636 |
| 2015/0284087 | A1 * | 10/2015 | Henshaw | B64D 11/064 |
| | | | | 297/316 |
| 2017/0152047 | A1 * | 6/2017 | Rebmann | B60N 2/42709 |
| 2020/0339017 | A1 * | 10/2020 | Schueler | B60N 2/16 |
| 2022/0371485 | A1 * | 11/2022 | Junk | B60N 2/161 |

FOREIGN PATENT DOCUMENTS

| | | | |
|---|---|---|---|
| EP | 0245650 | A2 * | 11/1987 |
| FR | 2706381 | A1 | 12/1994 |
| WO | 2015167378 | A1 | 11/2015 |

* cited by examiner

[Fig. 1]
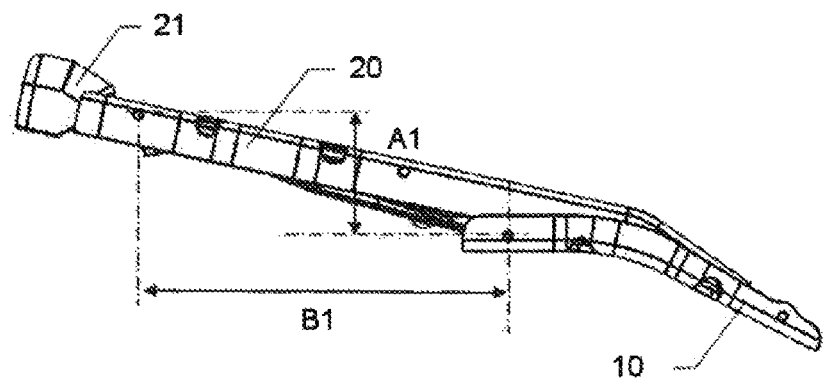
[Fig. 2]
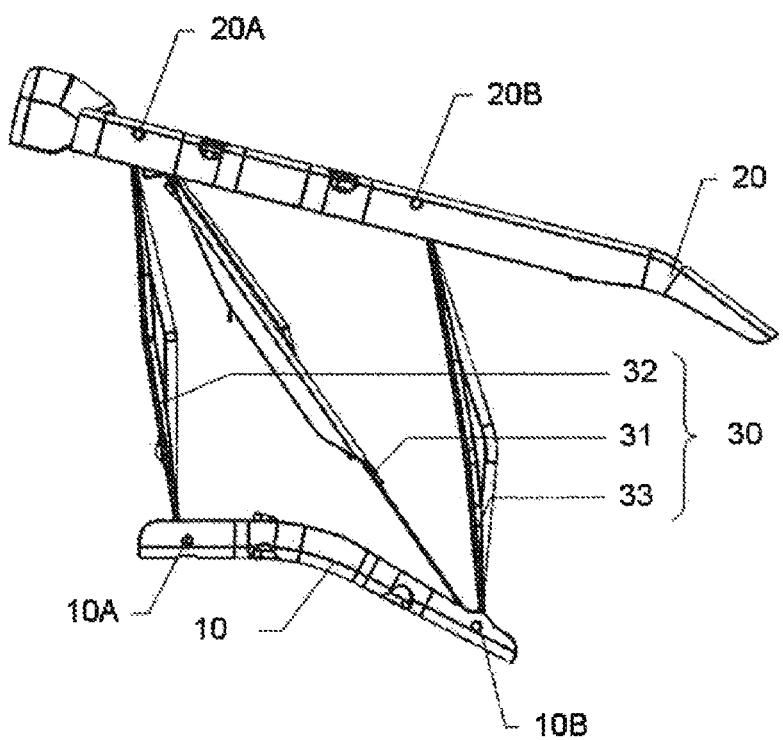

[Fig. 3]
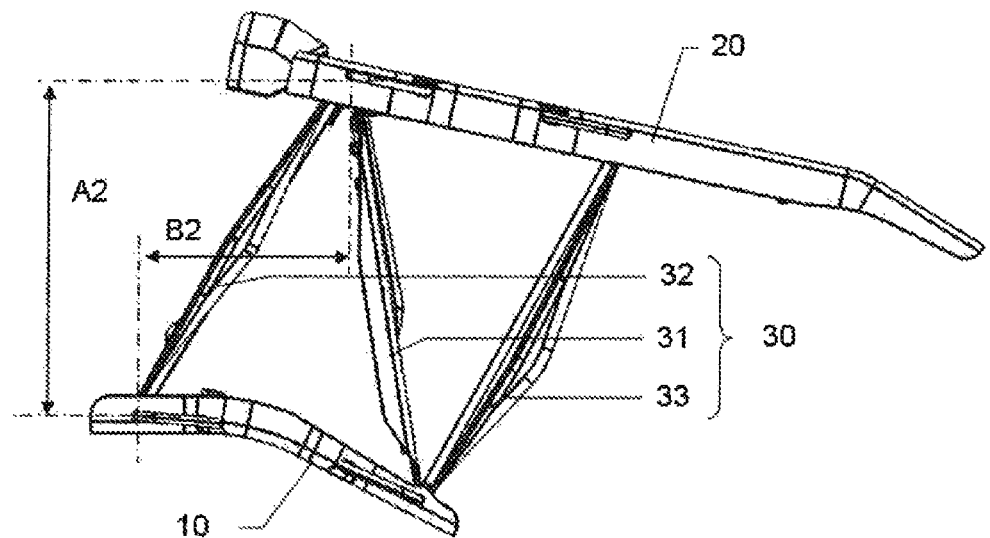
[Fig. 4]
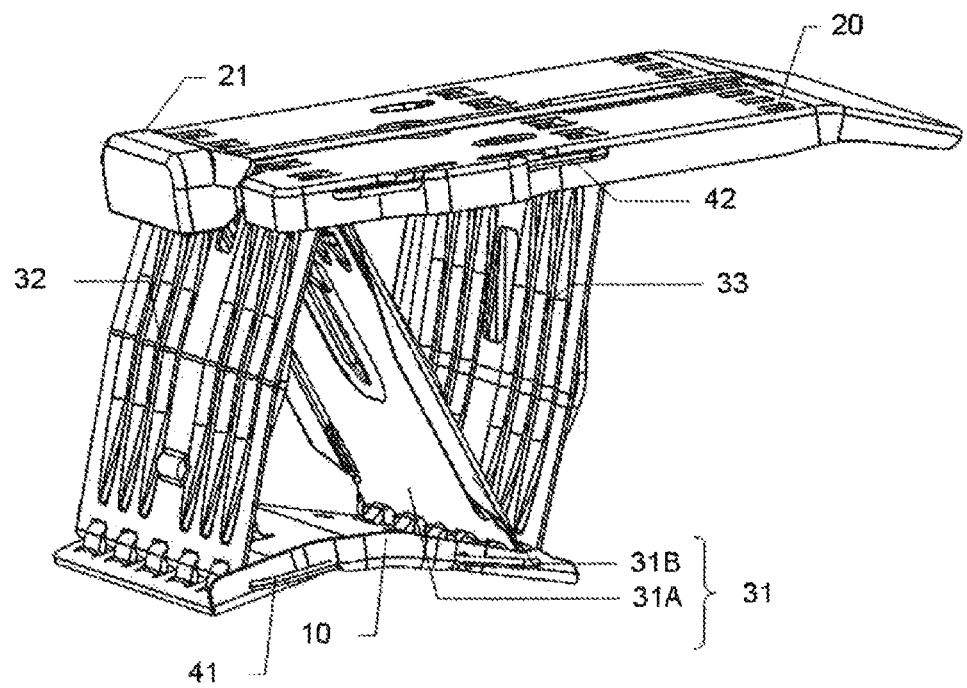

[Fig. 5]
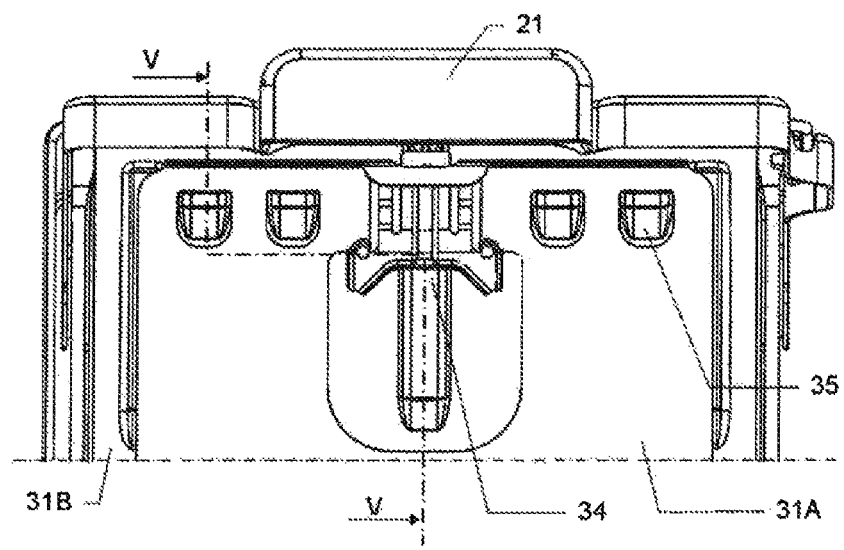
[Fig. 6]
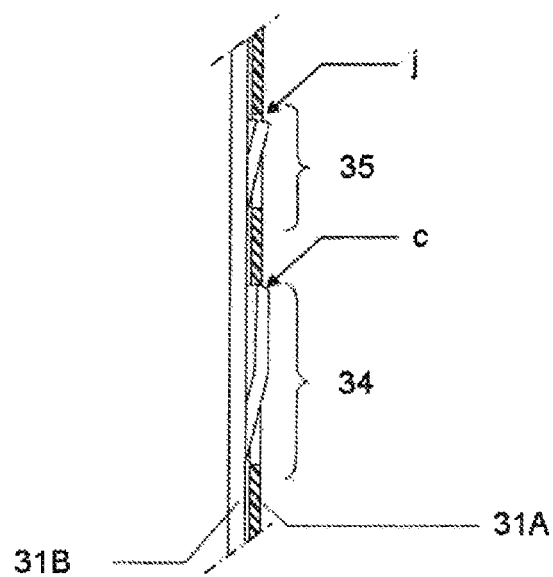

[Fig. 7]
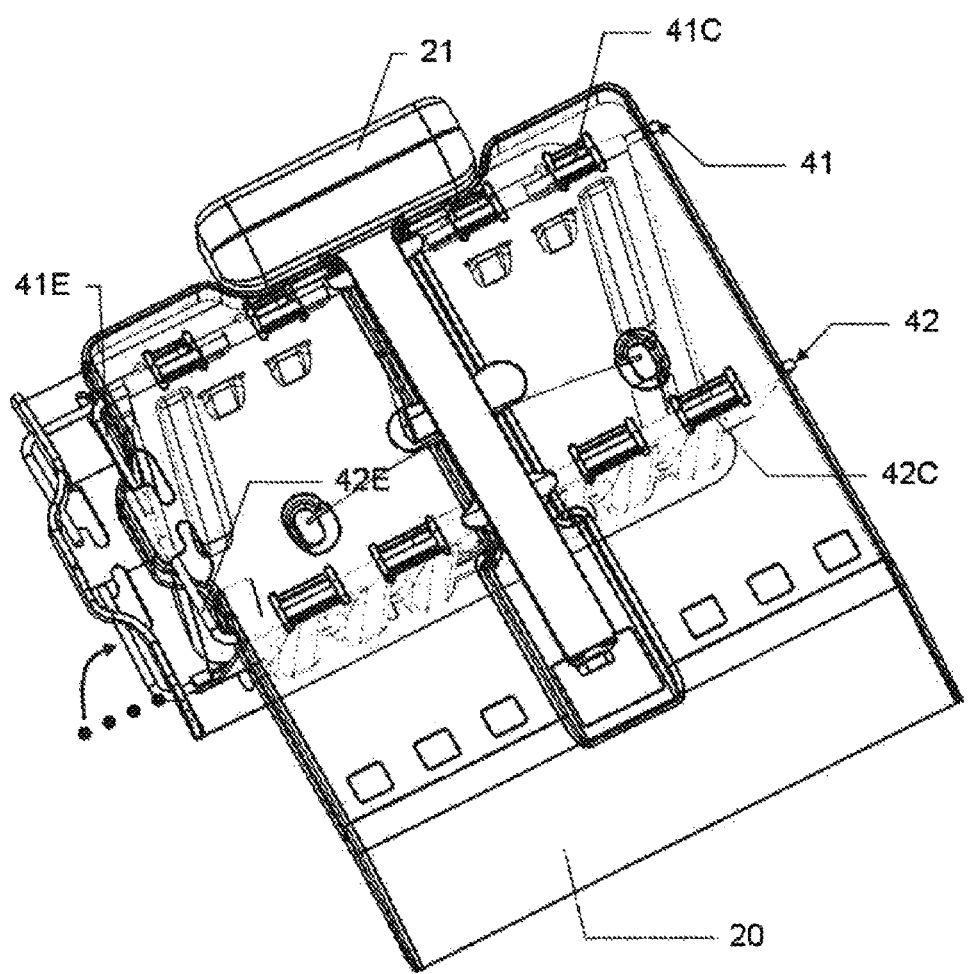

ADJUSTABLE-HEIGHT SEAT DEVICE

The present invention relates to a seat device and in particular to a seat device intended to allow the height adjustment of a seat portion. According to a particular example, the present invention proposes an adjustable seat device intended to be integrated into a vehicle seat or bench seat, to make it possible to raise a portion of the vehicle seat in order to place children and safely buckle their seatbelts.

Document WO2015167378 discloses an adjustable-height seat device, comprising in particular an articulation system with a deformable parallelogram and a diagonal reinforcement support, but this structure may be complex to manufacture, and may have shortcomings during use, with sliding between the diagonal reinforcement support and the articulation arms of the deformable parallelogram which may generate wear, noise or blockages.

An object of the present invention is to overcome the shortcomings of the background art mentioned above and in particular, firstly, to propose an adjustable seat device which is simple to manufacture and has an easy and reliable use.

Therefore, a first aspect of the invention relates to an adjustable seat device for a vehicle, comprising:

a base portion, a seat portion that is movable with respect to the base portion between a first position, referred to as retracted, and a second position, referred to as extended, an articulation system forming a deformable parallelogram, which is connected to the base portion and to the seat portion, and comprising at least one diagonal support arm connected diagonally to the deformable parallelogram, characterized in that the diagonal support arm is designed to have a first length when the seat portion is in the first position, and a second length when the seat portion is in the second position.

The device according to the above implementation comprises a diagonal support arm whose length varies. In other words, the diagonal support arm is extensible and designed to vary in length during the movement of the seat portion with respect to the base portion. As a consequence, the two ends of the diagonal support arm can remain constantly hooked to the deformable parallelogram during extension or retraction, which simplifies the system and the kinematics and avoids providing sliding tracks for one end of the diagonal support arm on an articulation arm of the deformable parallelogram.

In the present application, a deformable parallelogram typically comprises four bars and forms a system made up of four rigid bodies, generally articulated to each other by rotary connections: ball joints or pivots. In their simplest form, the parts are bars, the connections being at the ends of the bars; one of the bars can be connected to the chassis of the vehicle or to its seat, and then forms the base portion; one of the other bars (opposite to the base portion) is then movable in a circular translational movement relative to the base portion.

Advantageously, the diagonal support arm is arranged to provide a mechanical stop for the seat portion when the seat portion is in the second position. A stop integrated into the diagonal support arm simplifies the overall design of the device.

Advantageously, the diagonal support arm comprises:

first locking means arranged to lock the diagonal support arm in the second length when the seat portion is in the second position, and arranged to engage and withstand a first force, referred to as normal use force, applied to the seat portion, second locking means arranged to lock the diagonal support arm in the second length when the seat portion is in the second position, and arranged to engage and withstand a second force, referred to as vehicle impact force and greater than the first force, applied to the seat portion, the second locking means being engaged only when the second force is applied to the seat. According to the above implementation, the diagonal support arm comprises two distinct locking means, each having a specific engagement mode. The first locking means are intended to provide a mechanical stop during normal use (to support an occupant, for example a child, whose weight is less than 60 kg, and preferably less than 45 kg, and more preferably less than 36 kg). The second locking means are intended to provide a mechanical stop during a sudden deceleration of the vehicle, i.e., an impact, when the force applied is much greater than that created by the weight of a child (for example several hundred kilograms).

In detail, in the position of use, the first locking means are engaged during normal use, and there is then a clearance or a space within the second locking means, so that the system is not hyperstatic. Manufacturing is simplified. However, in the event of a vehicle crash, the deceleration imparted to the vehicle and the occupants may generate a second (significant) force on the system. The first locking means are intended to deform so as to take up the clearance or internal space of the second locking means, which have a higher resistance capacity once engaged, in order to withstand the second force.

Advantageously, the diagonal support arm comprises:

a first part and a second part that is movable with respect to the first part. The internal structure is simple, with only two internal parts movable with respect to each other.

Advantageously, the second part is movable with respect to the first part:

according to a translational movement during a first part of the movement of the seat portion from the retracted position to the extended position, according to at least one locking rotation during a second part of the movement of the seat portion from the retracted position to the extended position. Advantageously, the locking rotation occurs at the very end of the movement of the seat portion.

Advantageously, the second part is movable with respect to the first part:

according to a translational movement during a first part of the movement of the seat portion from the retracted position to the extended position, according to a translational movement combined with an elastic deformation of one of the second part or of the first part, during a second part of the movement of the seat portion from the retracted position to the extended position. The elastic deformation can be generated by a portion of the first locking means.

Advantageously, the diagonal support arm comprises a sliding connection of the first part with respect to the second part.

Advantageously, the second part is pivotally mounted with respect to the seat portion, and the first part is pivotally mounted with respect to the base portion.

Advantageously, the first part and/or the second part is/are formed from a stamped sheet metal. In particular, the sliding connection is then obtained by folding down two U-shaped sheet metal portions, on each side of one of the two parts.

Advantageously, the articulation system comprises:

a first articulation arm, connected to a lower front pivot of the base portion and to an upper front pivot of the seat portion, a second articulation arm connected to a lower rear pivot of the base portion and to an upper rear pivot of the seat portion, and the diagonal support arm is connected to the upper front pivot of the seat portion and the lower rear pivot of the base portion.

Advantageously, the adjustable seat device comprises at least one elastic return element, and at least two discrete pivot joints of the deformable parallelogram each comprise a portion of said at least one elastic return element.

Advantageously, said at least one elastic return element is formed by a resilient wire comprising at least two rectilinear portions, each rectilinear portion forming a hinge axis for each of the two discrete pivot pivots.

As a consequence, each rectilinear portion acts as a torsion bar and it is possible to provide a comb at the end of each part connected to the joint, with bores for receiving the rectilinear portions. The assembly and manufacture of the parts are easy.

Advantageously, said at least one elastic return element comprises at least one end plastically deformed, so as to make the elastic return element irremovable from the pivot joints. Indeed, at the end of assembly, a folding operation (permanent deformation) makes it possible to make the system irremovable, which ensures good safety of use.

Advantageously, said at least one elastic return element has a generally U-like shape, with its ends folded, so as to make the elastic return element irremovable from the pivot joints.

Advantageously, said at least one elastic return element has a tensioning effect so as to impart to the seat portion an equilibrium position arranged between the retracted position and the extended position. According to an initial adjustment, the equilibrium position is provided between the retracted position and the extended position, the movement from each of these retracted or extended positions to the other causing a tensioning which makes it possible to limit the rattling noises. This also facilitates the use of the system, with an automatic start of movement from one of the retracted or extended positions to the equilibrium position.

Advantageously, the adjustable seat device comprises a control handle. It is of course possible to provide a locking system in the retracted position controlled by the handle. In particular, it is possible to provide a locking bolt directly integrated in the handle, which is mounted on the seat portion, and a latch in the base portion (or vice versa), so that the bolt can engage in the latch when the seat portion is in the retracted position.

A second aspect of the invention relates to a seat cushion, preferably for a seat in the second or following row, comprising at least one adjustable seat device according to the first aspect of the invention.

A third aspect of the invention relates to a motor vehicle, comprising at least one adjustable seat device according to the first aspect of the invention.

A fourth aspect of the invention relates to an assembly method of an adjustable seat device according to the first aspect of the invention, comprising at least one step of assembling a pivot joint of the deformable parallelogram, comprising the steps of:

inserting a rectilinear portion of an elastic return element forming a hinge axis into at least one female portion of each of the parts connected to the pivot joint, so as to form a hinge, plastically deforming a free end of the rectilinear portion, so as to make the elastic return element of the formed hinge irremovable.

Advantageously, the assembly method comprises a step consisting of hooking the folded end to one of the parts connected to the pivot joint.

Advantageously, the assembly method comprises a step consisting of tensioning the elastic return element prior to hooking the folded end to one of the parts connected to the pivot joint.

The accompanying drawings illustrate the invention:

FIG. 1 depicts a seat device according to the invention, with a seat portion in a retracted position;

FIG. 2 depicts the seat device of FIG. 1, with the seat portion in an equilibrium position;

FIG. 3 depicts the seat device of FIG. 1, with the seat portion in an extended position;

FIG. 4 depicts the seat device of FIG. 1 in perspective, with the seat portion in the extended position;

FIG. 5 depicts a front partial view of the seat device of FIG. 1, with the seat portion in the extended position;

FIG. 6 depicts a sectional view of the seat device of FIG. 5, with the seat portion in the extended position;

FIG. 7 depicts the seat device of FIG. 1 in perspective, with the seat portion in the extended position.

With reference to these drawings, the adjustable seat device comprises in particular a base portion 10, a seat portion 20, and an articulation system 30.

FIGS. 1 to 3 depict the adjustable seat device without its upholstery, i.e., only the reinforcement or structural parts are depicted. The adjustable seat device is intended to be integrated into a vehicle seat, with the seat portion 20 in the retracted position (FIG. 1) arranged flush with or at the same level as the rest of the vehicle seat, and the seat portion 20 in the extended position (FIG. 3 or FIG. 4 or FIG. 7) arranged above the rest of the vehicle seat, in order to allow a small child to be correctly buckled, which avoids the need to provide a separate booster seat.

FIG. 1 depicts the seat device with the seat portion 20 in a retracted position, i.e., with the seat portion 20 folded against the base portion 10. Thus, the seat portion 20 and the upholstery (not depicted) of the seat portion 20 may be located at the same level as the rest of the seat of the vehicle. An adult can sit comfortably.

FIG. 3 depicts the seat device with the seat portion 20 in an extended position, i.e., with the seat portion 20 raised with respect to the base portion 10. Thus, the seat portion 20 and the upholstery (not depicted) of the seat portion 20 are well above the rest of the seat of the vehicle, so that a small child can be safely buckled up.

According to the example depicted and with reference to FIGS. 1 and 3, the seat portion 20 moves:

(A2−A1)=95 mm in the vertical upward direction; (B1+B2)=150 mm in the horizontal rearward direction. Of course, these values are indicative, and it is possible to envisage adjusting them as required.

The seat device comprises an articulation system 30, with a deformable parallelogram visible in FIGS. 2, 3, 4 and 7, and in particular formed by:

a first articulation arm 32, connected to a lower front pivot 10a of the base portion 10 and to an upper front pivot 20A of the seat portion 20, and a second articulation arm 33 connected to a lower rear pivot 10B of the base portion 10 and to an upper rear pivot 20B of the seat portion 20.

The articulation system 30 also comprises a diagonal support arm 31 connected to the upper front pivot 20A of the seat portion 20 and to the lower rear pivot 10B. According to one aspect of the invention, the diagonal support arm 31 has a variable length: in fact, when the seat portion 20 is in the retracted position, the diagonal support arm 31 has a first length, and when the seat portion 20 is in the extended position, the diagonal support arm 31 has a second length. This embodiment is preferred because it limits the number of pivot connections. However, other embodiments can be provided by connecting the diagonal support arm 31 by independent pivot connections to the first and/or second arm and/or to the base and/or seat portion.

To this end, the diagonal support arm 31 comprises a first part 31A and a second part 31B movable with respect to the first part 31A. According to the depicted embodiment, the second part 31B is movable with respect to the first part:

according to a translational movement during a first part of the movement of the seat portion 20 from the retracted position to the extended position, in accordance with at least one locking rotation during a second part of the movement (i.e., the end of the movement) of the seat portion 20 from the retracted position to the extended position. By way of example, the first part 31A and/or the second movable part 31B is provided in stamped/punched/ribbed/bent sheet metal, so as to provide a compact size and good rigidity. It is easy to provide a sliding connection, for example by folding down the edges of a metal sheet, in order to receive a second metal sheet.

According to the example depicted, the diagonal support arm 31 has its length reduced when it moves from the retracted position to the extended position. As a result, in the extended position, the slide portion of the second part 31B is close to the lower rear pivot 10B, which provides good rigidity.

In order to ensure the extended position of the seat portion 20, in FIG. 3, the diagonal support arm 33 is arranged to provide a mechanical stop for the seat portion 20 when the seat portion 20 is in the second position referred to as extended position.

In particular, FIG. 5 illustrates in detail the diagonal support arm 31, which comprises:

first locking means 34 arranged to lock the diagonal support arm 31 in the second length when the seat portion 20 is in the second position, and arranged to engage and withstand a first force, referred to as normal use force, applied to the seat portion 20, second locking means 35 arranged to lock the diagonal support arm 31 in the second length when the seat portion 20 is in the second position, and arranged to engage and withstand a second force, referred to as vehicle impact force and greater than the first force, applied to the seat portion 20, the second locking means 35 being engaged only when the second force is applied to the seat.

As depicted in FIGS. 5 and 6, the first locking means 34 and the second locking means 35 are each formed by at least one notch or bearing zone in the first part 31A and by a protrusion in the second part 31B. Once the protrusions are engaged in their respective notches or on their bearing zones when the seat portion 20 reaches the extended position, the locking means prevent any return to the retracted position.

Furthermore, in order to facilitate the manufacture of the diagonal support arm 31, only the first locking means 34 are engaged in normal use (i.e., with a child seated on the seat portion 20), as shown in the section depicted in FIG. 6, according to the axis V-V in FIG. 5. Indeed, the first locking means 34 are in contact (c) on the section, whereas a clearance (j) is provided at the level of the second locking means 35.

However, in the event of a vehicle impact, much greater forces are applied to the seat portion 20, and then the first locking means 34 are intended to deform, so that the clearance j is taken up at the level of the second locking means 35, and each protrusion of the second locking means 35 comes into contact with its respective notch, so that the seat portion 20 is locked in a safe and effective manner in the second position, i.e., extended position.

Nevertheless, it will be noted that this implementation makes it possible to avoid providing tight adjustments during the manufacture of the first part 31A and of the second part 31B, since only the first locking means 34 are engaged in the normal situation (first limited force), and a slight deformation of the first locking means 34 under the second force in the event of a vehicle impact makes it possible to engage the second locking means 35. As a consequence, it is not necessary to provide for precise positioning of the first locking means 34 with respect to the second locking means 35.

In order to unlock the seat portion 20 from the extended position, a lever arm, provided at the level of the first locking means 34, is actuated by the handle 21, which makes it possible to release the first locking means, and the second locking means, by pivoting the first part 31A with respect to the second part 31B, which can then slide with respect to each other to allow the seat portion 20 to go into the retracted position.

Elastic return means are also provided, with two elastic return elements 41 and 42 provided in the articulation system, to impart an equilibrium position on the seat portion 20, arranged between the retracted position and the extended position. In other words, the elastic return elements 41 and 42 are pretensioned so as to start automatically pulling the seat portion 20 out of the retracted position, and also so as to start automatically folding the seat portion 20 from the extended position.

Moreover, as shown in FIG. 7 (in which the seat portion 20 is transparent, in order to show the parts located behind in fine lines), each elastic return element 41 and 42 comprises at least one rectilinear portion 41C and 42C which forms a hinge axis of the deformable parallelogram.

Advantageously, as depicted herein, the first elastic return element 41 forms the hinge axis at the lower front pivot 10a (between the base portion 10 and the first articulation arm 32) and at the upper front pivot 20A (between the seat portion 20 and the first articulation arm 32).

The second elastic return element 42 forms the hinge axis at the level of the lower rear pivot 10B (between the base portion 10 and the second articulation arm 33) and at the level of the upper rear pivot 20B (between the seat portion 20 and the second articulation arm 33).

Finally, in order to ensure the reliability of the system and in particular to avoid any disassembly or dislocation, each elastic return element comprises ends 41E and 42E, which have been plastically deformed (folded) and anchored in the base portion 10 and in the seat portion 20, after assembly, in order to make the system irremovable (see the example in dashed lines in FIG. 7 at the bottom left).

It will be understood that different modifications and/or improvements which are obvious for the person skilled in the art may be made to the different embodiments of the invention described in this present description without departing from the scope of the invention. In particular, it is possible to combine all the embodiments disclosed hereinbefore, as long as there is no technical or structural incompatibility.

The invention claimed is:

1. An adjustable seat device for a vehicle, comprising:
a base portion,
a seat portion that is movable with respect to the base portion between a first retracted position, and a second extended position,
an articulation system forming a deformable parallelogram, which is connected to the base portion-and to the seat portion and comprising at least one diagonal support arm connected diagonally to the deformable parallelogram,
wherein the diagonal support arm has a first length when the seat portion is in the first retracted position and a second length when the seat portion is in the second extended position,
first locking means arranged to lock the diagonal support arm in the second length when the seat portion is in the second extended position, and arranged to engage and withstand a first normal use force applied to the seat portion,
second locking means arranged to lock the diagonal support arm in the second length when the seat portion is in the second extended position, and arranged to engage and withstand a second vehicle impact force, greater than the first force, applied to the seat portion,
wherein the second locking means is engaged only when the second force is applied to the seat.

2. The adjustable seat device according to claim 1, wherein the diagonal support arm is arranged to provide a mechanical stop for the seat portion when the seat portion is in the second position.

3. The adjustable seat device according to claim 1, wherein the diagonal support arm comprises:
a first part and
a second part that is movable with respect to the first part.

4. The adjustable seat device according to claim 3, wherein the second part is movable with respect to the first part:
in a translational movement during a first part of the movement of the seat portion from the first retracted position to the second extended position,
in at least one locking rotation during a second part of the movement of the seat portion from the first retracted position to the second extended position.

5. The adjustable seat device according to claim 3, wherein the second part is pivotally mounted with respect to the seat portion, and wherein the first part is pivotally mounted with respect to the base portion.

6. The adjustable seat device according to claim 1, wherein the articulation system further comprises:
a first articulation arm, connected to a lower front pivot of the base portion and to an upper front pivot of the seat portion,
a second articulation arm connected to a lower rear pivot of the base portion and to an upper rear pivot of the seat portion,
wherein the diagonal support arm is connected to the upper front pivot of the seat portion and the lower rear pivot of the base portion.

7. The adjustable seat device according to claim 1, comprising at least one elastic return element, and wherein at least two discrete pivot joints of the deformable parallelogram each comprise a portion of the at least one elastic return element.

8. The adjustable seat device according to claim 7, wherein the at least one elastic return element is formed by a resilient wire comprising at least two rectilinear portions, each of the rectilinear portions forming a hinge axis for each of the two discrete pivot joints.

9. The adjustable seat device according to claim 7, wherein the at least one elastic return element has a tensioning effect so as to impart to the seat portion an equilibrium position arranged between the first retracted position and the second extended position.

10. A seat cushion, for a seat in the second or following seating row of the vehicle, comprising at least one adjustable seat device according to claim 1.

11. A motor vehicle comprising at least one adjustable seat device according to claim 1.

12. An assembly method of an adjustable seat device for a vehicle comprising the steps of;
providing a base portion,
providing a seat portion that is movable with respect to the base portion between a first retracted position, and a second extended position,
providing an articulation system forming a deformable parallelogram, which is connected to the base portion- and to the seat portion and comprising at least one diagonal support arm connected diagonally to the deformable parallelogram,
wherein the diagonal support arm has a first length when the seat portion is in the first retracted position and a second length when the seat portion is in the extended second position,
providing first locking means arranged to lock the diagonal support arm in the second length when the seat portion is in the second extended position, and arranged to engage and withstand a first normal use force applied to the seat portion,
providing second locking means arranged to lock the diagonal support arm in the second length when the seat portion is in the second extended position, and arranged to engage and withstand a second vehicle impact force, greater than the first force, applied to the seat portion,
wherein the second locking means are engaged only when the second force is applied to the seat,
further comprising a step of assembling a pivot joint of the deformable parallelogram, comprising the steps of:
inserting a rectilinear portion of an elastic return element forming a hinge axis into at least one female portion of each of the parts connected to the pivot joint, so as to form a hinge,
plastically deforming a free end of the rectilinear portion to form a folded end, so as to make the elastic return element of the formed hinge irremovable,
hooking the folded end to one of the parts connected to the pivot joint, and
tensioning the elastic return element prior to hooking the folded end to one of the parts connected to the pivot joint.

* * * * *